Figure 1:
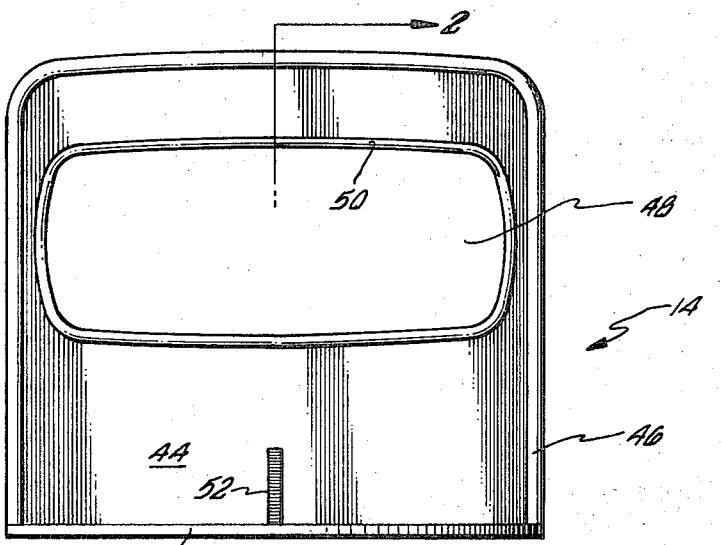
Figure 1:
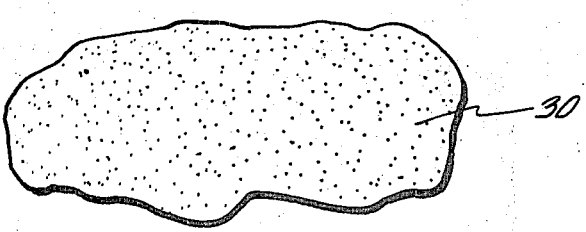
Figure 1:
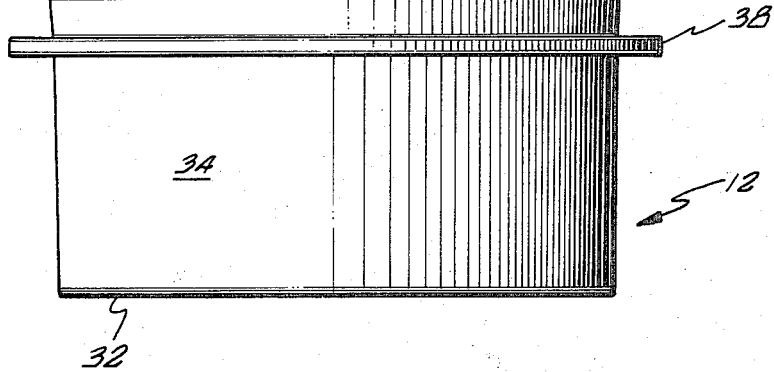
Figure 1:
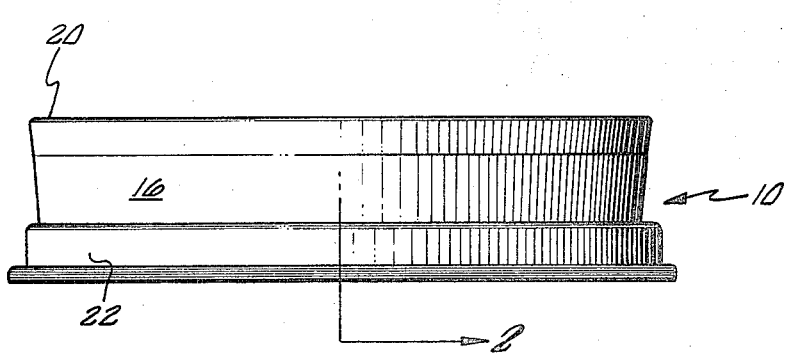

United States Patent [19]
Boucher

[11] 3,837,775
[45] Sept. 24, 1974

[54] COMBINED FOOD STORAGE CONTAINER AND MOLD THEREFOR

[75] Inventor: Richard A. Boucher, Northboro, Mass.

[73] Assignee: Dart Industries Inc., Los Angeles, Calif.

[22] Filed: Aug. 16, 1973

[21] Appl. No.: 388,850

[52] U.S. Cl.................. 425/195, 425/318, 425/412, 425/452
[51] Int. Cl............................................. A23p 1/00
[58] Field of Search ............ 425/318, 412, 452, 195

[56] References Cited
UNITED STATES PATENTS

| | | |
|---|---|---|
| 1,345,932 | 7/1920 | Kirk .................................. 425/195 |
| 1,782,076 | 11/1930 | Safford, Sr. ......................... 425/318 |
| 2,059,353 | 11/1936 | Houck .............................. 425/195 |
| 2,466,407 | 4/1949 | Friesledt et al. ..................... 425/195 |
| 2,896,555 | 7/1959 | Marcus et al. .................. 425/412 X |
| 3,411,184 | 11/1968 | McGowan...................... 425/195 X |
| 3,427,687 | 2/1969 | Miller .............................. 425/195 |

Primary Examiner—Robert L. Spicer, Jr.

[57] ABSTRACT

A modular food storage container and a mold and press used in conjunction therewith enables the production of a molded foodstuff within the container and out of contact with the sidewall areas thereof. The container is further adapted for interengagement with like containers to produce an integral sealed stack of such containers each containing the foodstuff described.

3 Claims, 3 Drawing Figures

PATENTED SEP 24 1974

3,837,775

SHEET 1 OF 2

COMBINED FOOD STORAGE CONTAINER AND MOLD THEREFOR

The present invention relates to the preparation and storage of foodstuffs and more particularly concerns the molding and storing of food patties in such manner as to optimize the use of freezer storage space. Further such readily enables a controlled withdrawal of stored product for use or service and provides for easy removal of the product from each container.

In many instances it is preferable or desirable to prepare food products in advance and to freeze or otherwise store same in anticipation of such future use. Furthermore, in instances of this type ideal individual serving sizes are predetermined so that prior preparation and storage are fully consistent with the anticipated or desired end result or usage. Accordingly, for example, meat product has been prepressed into hamburger pattie form. Each pattie is thereafter separated one from the other by a paper or similar sheet separator prior to their being containerized and frozen.

Such prior technique does not contemplate the complete separation of each pattie one from the other nor does it provide a means to orderly control the usage of product. Likewise, if the pattie perchance is retained in its mold for freezing, removal thereof can present difficulties due to the allaround adherence of the product to that mold.

This invention contemplates a solution for the noted problems and also provides several additional advantages which will become more apparent hereinafter. In particular, the storage container and the patty mold are constructed for interengagement in such fashion that the molded product as formed therein will be retained out of contact with the container sidewalls. This minimizes the contact between container and product and therefore enables such product to be more easily removed from the container at the intended time of use. Further, each container is ideally designed to sealingly engage a like container so that such form a sealed stack each contained pattie being separate from the others. Thus, the product patties or the like are separately stored yet the individual storage modules integrate to form a single overall assembled container. This type of assembly retains the like product together and minimizes the elemental number of separate pieces required in so doing (i.e., separate closures and containers).

Furthermore, retention of product in this separable stacked fashion assures controlled usage. Therefore, the oldest stored product may be removed from containers at one end of the stack while the newest or freshest product is accumulated in the stack at the other end thereof. This type of control will assure minimization of spoilage due to over retention and aging of foodstuff.

Accordingly, it is a principal objective of the invention to provide relatively small storage containers capable of interengagement one with the other. Additionally, it is an objective to mold product in such containers in a fashion that maintains same out of contact with the container sidewalls.

Figure 2:
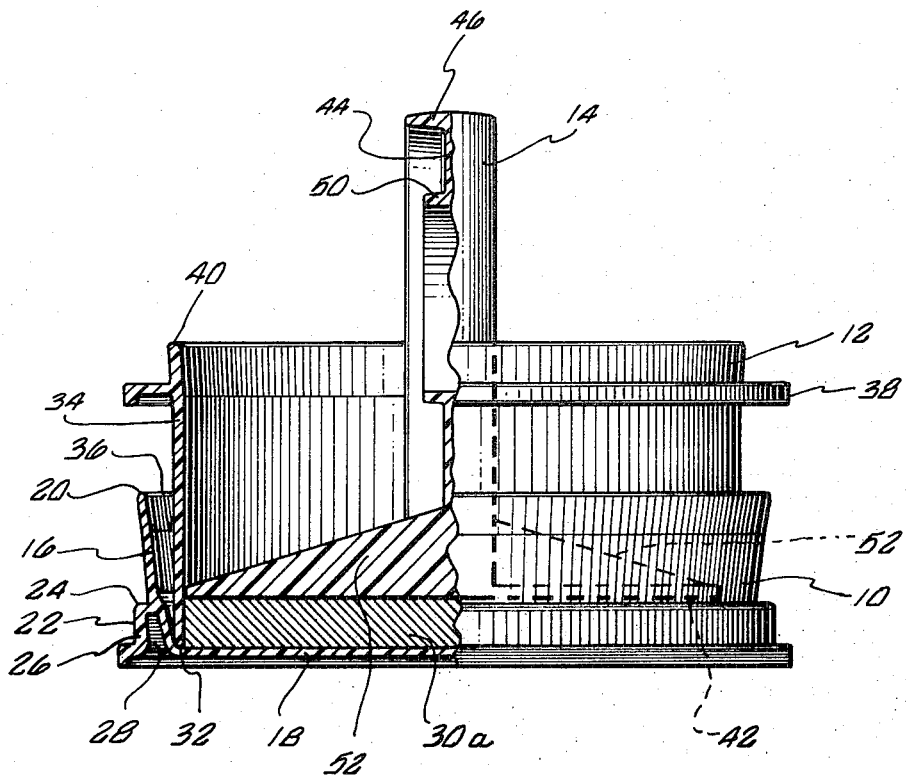
Figure 3:
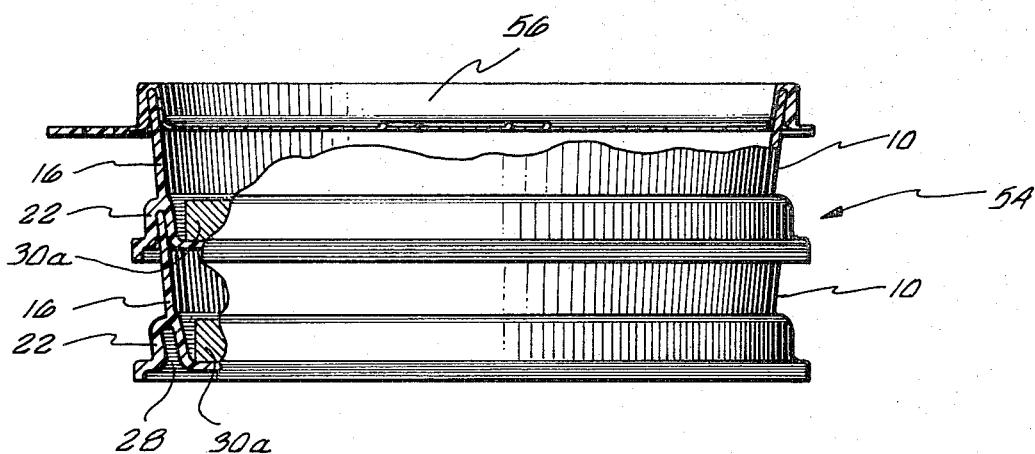

These and various other objects and advantages will become more apparent from the ensuing description and claims wherein reference is made to the accompanying drawings, in which FIG. 1 is an exploded side elevational view of the invention showing a press, mold ring and storage container as well as foodstuff that is to be formed and stored thereby;

FIG. 2 is an interrelated or assembled side elevational view of the elements shown in FIG. 1 partially broken away as along line 2—2 of FIG. 1; and FIG. 3 is a partial cross-sectional side elevational view of a plurality of storage containers like those of FIGS. 1 and 2, illustrating the typical interengagement between such as well as a closure for the top-most container in the stack.

As is above indicated, the invention's principal contemplation is of the molding of product in a stackable storage container.

Although usage of the invention is intended for moldable meat product, for example, hamburger, it is obviously not restricted thereto. Accordingly, FIGS. 1 and 2 illustrate the interrelationship between the various components which include a container member 10, an open-ended mold 12, and a press member 14.

The storage container 10 includes an upstanding sidewall 16 that is integrally formed with and extends from a substantially planar imperforate bottom wall 18 (FIG. 2). Intermediate the bottom wall 18 and the terminus 20 of the sidewall there is formed an integral peripherally extending lip 22. This lip is basically fashioned by a ledge 24 and a downwardly extending wall 26 that is spaced from sidewall 16, approximately parallels same, and terminates at a point or in a plane proximate that of bottom wall 18. Accordingly, a sealing groove 28 is formed between the wall 26 and sidewall 16. Such groove, its function and purpose will be discussed in further detail hereinafter.

FIGS. 1 and 2 also depict a moldable foodstuff 30 in its premolded and post-molded form respectively. Further, with continued reference to these FIGS. it can be seen that the open-ended mold member 12 is of a shape and size such that upon placement in the container 10 one end 32 of its wall 34 approximates the planar size and shape of container bottom wall 18. Accordingly, the mold member fits snugly into the container at the junction of the container side and bottom walls, 16 and 18 respectively.

The mold 12 container 10 arrangement, as above described, enables the formation of a foodstuff patty 30a that is positioned out of contact with the container side wall 16. In this respect note that the space 36 is maintained between the open-ended mold 12 and container sidewall 16. Thus, even though the container 10 functions as a portion of the mold, it is only the bottom wall 18 thereof that is so employed. This then further provides that the barest minimum of molded product 30a contacts the containers interior surfaces. Such minimum contact of course assures the easiest possible removal of that product at the time of use.

The wall 34 of open-ended mold member 12 is ideally of a length such that it will extend substantially above terminus 20 of container sidewall 16. This will enable the user to perfect a better control over all elements of the combination during the molding function. Furthermore, it is preferred that a reinforcing bead or handle-like rim 38 be provided adjacent the upper edge 40 of the mold. This lends additional support to this member 12 and also provides a means for better gripping such member.

A necessary third component to the effective utilization of this assembly is the press member 14. This member includes a substantially planar press wall 42 that is of a size and shape corresponding to the inside dimensional characteristics of open-ended mold member 12. Another or second integral upstanding wall 44 extends perpendicularly from the press wall 42. This second wall is bounded by a web portion 46 that completely surrounds same and extends transversely thereof. Likewise, wall 44 has an opening 48 therein which is shaped to accommodate a user's finger digits. The opening is also bounded by a transverse web 50 and is spaced from the top-most section of wall 44 so that a comfortable handle grip is formed thereby. Additionally, the press member may employ reinforcing ribs 52. The number, spacing and size of these ribs will, of course, be determined by the construction of the basic press member elements above-described but it is preferable to minimize the number required.

From the foregoing, it should be apparent that the patty press combination described contemplates the use of the ultimate storage container 10 in the molding of product. This, of course, negates any necessity of rehandling molded foodstuff subsequent to its formation. However, due to the unique modular design of the instant container, it is further contemplated as a part of this invention, that similar molded product 30a may be maintained in a unitary multicompartmented container 54 as illustrated by FIG. 3 and as formed by interengaging the individual storage containers 10 one with the other in a sealed stacked arrangement.

Thus, after the product or foodstuff 30 is molded as at 30a in separate containers 10, such containers may be interconnected as shown. The noted interengagement or interconnection is effected by inserting the terminus 20 of the sidewall 16 of one container into the sealing groove 28 of another such container. Accordingly the bottom wall of each intermediate container so stacked functions as the closure for the container below it. In the shown stacked relationship of containers 10 only one separate closure 56 is required. The noted closure 56 of course is employed to seal the uppermost container 10 in the stack. Accordingly, a minimum number of elements are required in providing a maximum of segregated container compartments.

Although only two storage containers 10 and one closure 56 are shown in FIG. 3, it should be apparent that many more such containers may be added to the stack, depending only upon the particular storage facility into which such stack is to be placed. It should also be pointed out that the container construction, and in particular, the sealing groove 28 and mating sidewall terminal area 20 provide a hermetic seal for each container 10. Furthermore, as is apparent from the various FIGS. in the preferred embodiment storage containers 10 are identical in size and shape.

I claim:

1. In combination a patty-press unit and modular container adapted for the preparation and storage of waferlike mold foodstuff items and including a container member having an upstanding sidewall integrally extending from a substantially planar bottom wall, said sidewall further having a peripherally positioned lip affixed thereto at a point spaced from the bottom wall interconnection therewith, such lip extending downwardly and approximately parallel to said sidewall to a terminus proximate the plane of said bottom wall; an open-ended mold member of a planar size and shape approximating the size and shape of said container bottom wall such that it is firmly positioned in said container yet spaced from the sidewall thereof, and a press member positioned within said mold member and having a reinforced substantially planar wall of a size corresponding to the inside dimensions of said mold member with a handle means upstanding therefrom.

2. In combination a patty-press unit and modular container according to claim 1 wherein said container sidewall and lip form a groove that sealingly engages the upper extremity of said sidewall of a like container and wherein the bottom wall thereof forms the closure for said like container.

3. In combination a patty-press unit and modular container according to claim 1 wherein the handle means of said press member includes a transversely positioned perpendicularly extending second wall, said second wall being bounded by a web and including an opening for accommodation of the user's finger digits.

* * * * *